United States Patent [19]

Gale et al.

[11] 4,157,220

[45] Jun. 5, 1979

[54] TECHNIQUE FOR RECORDING MICROPICTURE-INFORMATION ON A DIFFRACTIVE SUBTRACTIVE FILTER EMBOSSING MASTER

[75] Inventors: Michael T. Gale, Wettswil; Karl Knop, Zurich, both of Switzerland

[73] Assignee: RCA Corporation, New York, N.Y.

[21] Appl. No.: 897,027

[22] Filed: Apr. 17, 1978

[51] Int. Cl.² ...................... G03B 27/00; G03B 27/02; G03B 27/76

[52] U.S. Cl. ........................................ 355/19; 355/32; 355/71; 355/77

[58] Field of Search ...................... 355/19, 32, 77, 71; 350/162 SF, 162 R, 314; 96/38.2, 36, 38.3, 45

[56] References Cited

U.S. PATENT DOCUMENTS

| | | | |
|---|---|---|---|
| 3,040,640 | 6/1962 | Abel, Jr. et al. | 355/19 |
| 4,003,653 | 1/1977 | Kelly | 355/77 |
| 4,018,528 | 4/1977 | Dennis | 355/77 |
| 4,076,413 | 2/1978 | Smeaton | 355/77 X |

*Primary Examiner*—Richard A. Wintercorn

*Attorney, Agent, or Firm*—Samuel Cohen; George J. Seligsohn

[57] ABSTRACT

A group of separate large-size color or black-and-white pictures to be recorded on a master as very finely-screened (e.g. 10 micrometer period) micropictures in a given format, such as microfiche, are first reduced to a continuous-tone first recording at an intermediate size on a medium, such as 70 millimeter film. Then a relatively fine-screened (e.g. 40 micrometer period), high-contrast second recording, made from the first recording by contact printing, is reduced to micropicture size in the given format.

13 Claims, 3 Drawing Figures

TECHNIQUE FOR RECORDING MICROPICTURE-INFORMATION ON A DIFFRACTIVE SUBTRACTIVE FILTER EMBOSSING MASTER

The present invention relates to the fabrication of an embossed diffractive subtractive filter of a plurality of separate micropictures and, more particularly, to the derivation of a transparency useful in recording such micropicture information on a diffractive subtractive filter embossing master. The micropicture information may appear on the master in microfiche format, microfilm format, or any other desired format.

Reference is made to U.S. Pat. No. 3,957,354, issued May 18, 1976 to Knop, which discloses a diffractive subtractive color filtering technique. Reference is further made to U.S. Pat. No. 4,062,628, issued Dec. 13, 1977, to Gale, which discloses a black-and-white diffractive subtractive light filter. As disclosed in these patents, a diffractive-subtractive structure relief pattern embossed in the surface of a transmissive thermoplastic film may be used to filter incident white light to produce zero diffraction order light which exhibits a predetermined color hue (e.g., a subtractive primary color) or, alternatively, a neutral black. More specifically, a color hue is best derived from a rectangular diffraction grating, in which the particular color manifested by the zero diffraction order light is primarily a function of the grating depth, while a neutral black filter is best derived from two crossed sinusoidal diffraction gratings of different specified depths.

A black-and-white diffractive subtractive filter of picture information which exhibits a gray scale, may be achieved by means of screening to vary the relative portions of black-manifesting area (presence of diffraction-grating) and white-manifesting area (absence of diffraction-grating) within each resolvable picture element of the black-and-white filter. In this case, the size of any white-manifesting or black-manifesting area, while sufficiently small to be unresolvable in read-out, is still large relative to the diffraction-grating line-spacing. The saturation exhibited by a color-picture manifesting filter can be controlled in a similar manner by means of screening. Further, in the case of a color picture, it is normally necessary to properly register three filters, each corresponding to a different subtractive primary color (cyan, magenta or yellow) component of the picture information. Thus, while only a single embossing master is required for fabrication of a black-and-white diffractive subtractive filter, normally three separate embossing masters are required to provide a full color diffractive subtractive filter.

Reference is also made to the copending U.S. patent application Ser. No. 781,304, filed Mar. 25, 1977 now U.S. Pat. No. 4,108,660 by Gale et al. and assigned to the same assignee as the present application. Application Ser. No. 781,304 is directed to the fabrication of a diffractive subtractive filter embossing master, which may be made from any one of four different recording blanks, corresponding respectively to black, and each separate one of the three diffractive primary colors. The recording blank comprises a metal foil having an appropriate diffraction-grating relief structure (sinusoidal in the case of black and rectangular wave of proper depth in the case of each of the primary colors) on one surface of the foil. Further, the recording blank includes a layer of photoresist covering this foil surface. Picture information is recorded on the blank by selectively exposing the photoresist with the picture information. Usually this is accomplished by contact printing a transparency containing the picture information onto the photoresist. The fabrication of the master is completed by selectively removing the photoresist from the white-manifesting areas of the picture information, using a suitable photoresist developer, obliterating the diffraction grating from only these white-manifesting areas, and then removing the remainder of the photoresist using a suitable solvent.

Of particular interest is the case where the picture information contained on the transparency comprises a group of screened micropictures arranged in a preselected format, such as a microfiche. Each of the micropictures on the transparency usually is derived from a separate large picture, which may be a color picture, a black-and-white picture or a picture having both color portions and black-and-white portions. The present invention is directed to a procedure for deriving such a screened-micropicture transparency for use in the fabrication of a diffractive subtractive filter embossing master.

The present invention relates primarily to picture information which is fully or partially either in color or continuous-tone (gray-scale) black-and-white which requires screening. Although high contrast, line black-and-white picture information (text, lined drawings, etc.), which does not require screening, can also be handled by using the techniques of the present invention, it would normally be simpler and cheaper to use a more direct procedure to handle such high contrast, line black-and-white material.

Figure 1:
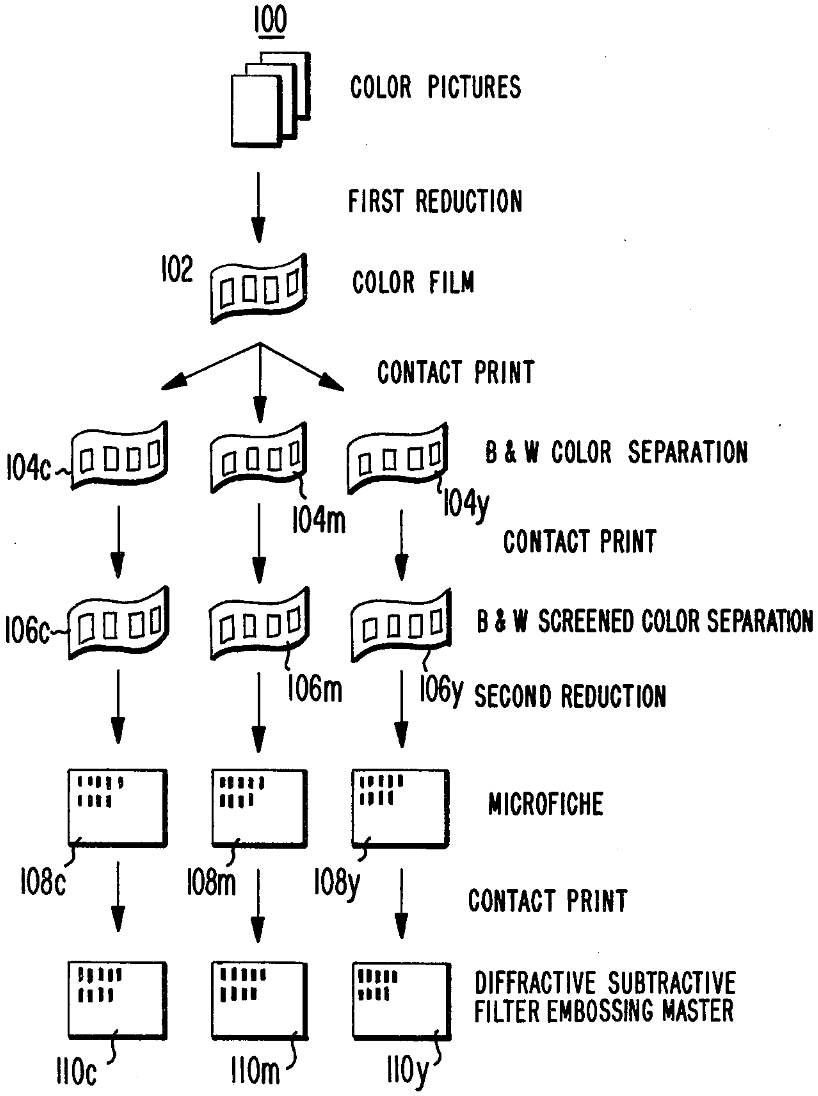
FIG. 1 is a flow sheet that illustrates the procedures of the present invention.

As shown in FIG. 1, the three diffractive subtractive filter embossing masters 110*c*, 110*m*, and 110*y*, (corresponding to the respective color components cyan, magenta and yellow) are derived, in microfiche format, from a group of separate, large format color pictures. Color pictures 100 may be originals such as photographic transparencies or, as is frequently the case, previously published printed pages, such as magnazine or book pictures which are screened (half-tone) "four-color" (three primary colors plus black) color prints. Further, a color print may also include solid black material, such as printed text, superimposed directly thereon. Typically, such a color print has the size of a printed page (e.g., 21×30 cm) and is screened at 150 lines (about 170 μm screening period).

In general, a microfiche format involves a reduction in size of each color picture of approximately 20 times. More specifically, a first microfiche format comprises 60 images, each reduced by a factor of 18. A second microfiche format comprises more than 60 images (such as 98), but reduces the size of the image by 24 times.

As discussed above, embossing master blanks for color filters comprise a rectangular-wave diffraction grating in a surface of a metal substrate, which surface is covered by a layer of photoresist. The respective gratings of the blanks of masters 110*c*, 110*m*, and 110*y* each have a different certain depth which determines the subtractive primary color hue (cyan, magenta or yellow) manifested thereby. Both the depth and line spacing of the gratings utilized by masters 110c, 110m and 110y are typically 1–2 μm. In accordance with the present invention picture-information saturation of microfiche images is to be provided by very fine screen dots, preferably having a center-to-center spacing of about 10 μm. Completely saturated color is manifested by the presence of the diffraction grating throughout the entire dot unit area. The degree of saturation of color-picture information within any dot unit area is manifested by the proportion of an entire dot unit area that is covered by non-obliterated diffraction grating. In order to provide a good gray scale, the proportion of the entire dot unit area covered by non-obliterated diffraction grating should be variable from 100 percent down to a value of about 5 percent.

Because the embossing masters 110c, 110m and 110y employ a fine screening pattern, a problem exists of generating unwanted Moire patterns when the original color pictures 100 already contain screened material. (The printed original screening is never sufficiently sharp to enable color separation and reduction of the individual screening dot patterns). It is therefore necessary to remove any screening pattern already present in color pictures 100 before the new fine screening pattern required by embossing masters 110c, 110m and 110y is introduced. Further, this must be accomplished without leading to any significant loss in resolution of the color picture information. In order to accomplish this, the overall reduction in picture image size is achieved in successive first and second steps. In the first step, the color-picture size is reduced to a selected intermediate size. In the subsequent second step this intermediate size is further reduced to the microfiche image size.

It is desirable to select a standard film size, such as 35 mm or 70 mm for the intermediate size format. While 35 mm film has the advantages over 70 mm film of decreasing the film quantity to be handled and the wider availability of processing equipment, it has the disadvantages of more severe registration, screening and film resolution requirements. For this reason, in the preferred embodiment described herein, it is assumed that the intermediate size format is 70 mm film.

Specifically, each of the color pictures 100, in turn, is reduced by suitable imaging means and photographed on a strip of color film 102, such as Kodak Internegative film. When each of color pictures 100 has a size of 21×30 cm and color film 102 is 70 mm film, the first reduction is about 5 times to give an image size of film 102 of about 40×56 mm. However, any already screened color picture 100 is typically screened at 150 lines/inch (about 170 μm period). This initial screening pattern is reduced to a screening pattern image at color film 102 having a period of only about 35 μm. The emulsion of color film 102 (like most present-day color emulsions) cannot clearly resolve a 35 μm period pattern, so that the reduced original screening pattern is lost and Moire problems are avoided. However, for coarser screening patterns or for higher resolution color film, the screening pattern image at color film 102 can be eliminated by either stopping down the imaging lens aperture or slight defocusing. In any case, the resolving power of the combination of the first reduction imaging and that of the emulsion of color film 102 should lie between the reduced screening pattern size (35 μm) and the finest picture or text feature to be maintained. A first reduction of about 5:1 meets this constraint (i.e., is large enough to eliminate any screening pattern that is present without, at the same time, leading to any significant loss in resolution of picture detail). Alternatively, either color positive or color negative film can be used as color film 102. However, the choice, as between these two, influences somewhat the procedure used to generate color separations in the next step, described below.

The use of color film strip 102, ensures that all the color pictures are handled together as a single strip of film, rather than a group of independent pictures. This considerably reduces handling and facilitates processing on conventional, existing machines. Further, the presence of standard perforation holes in the film ensures that registration is readily preserved in all subsequent film contact printing steps (in the sense that the position of each image is accurately held with respect to its neighbor). Tests with commercial machines, which contact print, frame-for-frame, using a transport mechanism which accurately positions the original and copy film on precision pins, have shown a registration precision to be better than 10 μm. (Alternatively, more complex registration schemes, using, for example, optical markings can be used.)

As indicated in FIG. 1, the next step is to contact print color film 102 on each of three respective black-and-white color separation films 104c (cyan), 104m (magenta), and 104y (yellow). Each of film strips 104c, 104m and 104y is continuous-tone (low gamma), panchromatic black-and-white film. Film strip 104c is contact printed from color film 102 employing white light that has been passed through a red filter to generate the cyan color separation. In a similar manner, film strip 104m is contact printed employing white light that has been passed through a green filter to generate the magenta color separation, and film strip 104y is contact printed with white light that has been passed through a blue filter to generate the yellow color separation. The ideal (theoretical) filter for producing perfect color separations have regions of negative transmittance and are not realizable in practice. Additionally, the non-ideal spectral transmittance both of the color film dyes and the diffractive subtractive filter gratings must be taken into account. Such problems are well known in the printing industry and are largely solved by special color masking techniques which may be used here. A number of commercially available color negative films have built-in masking in the emulsion make-up and processing. Positive color films require an additional low-contrast, low resolution masking film (also made by contact exposure through the color film) which is placed in contact with the rear side of the color film during the exposure of the separation; this has been demonstrated to give good results at 70 mm format and does not lead to any significant loss in resolution.

Each of the three color separation strips 104c, 104m and 104y contains a sequence of images of number equal to that of the final microfiche. Image alignment with respect to the film sprocket holes is ensured by using a precision transport or jig to hold the color and black-and-white film during exposure. Maximum precision and convenience is probably obtained using a frame-by-frame exposure (commercial equipment exists for this operation), although this is not essential.

It is now necessary to convert black-and-white color separations 104c, 104m and 104y, by contact printing, into black-and-white, high contrast, screened color separations 106c, 106m and 106y, respectively. In order that the final 10μm screen pattern be obtained after a second reduction of about 4 times (providing an overall reduction of about 20 times between color pictures 100 and embossing masters 110*c*, 110*m* and 110*y*), it is necessary to provide about a 40μm screening pattern in the intermediate-size format of film strips 106*c*, 106*m* and 106*y*.

As discussed above, typical printing uses a screen with about 150 lines/per inch (170μm). While finer contact screens, having about 300 lines per inch, are available, even this finer commercially available contact screen has a period of about 85μm, which is more than twice the required (about 40μm) screening period. Further, registration requirements favor a technique in which any one of the respective continuous-tone color separations 104*c*, 104*m* and 104*y*, rather than a screen, is in direct contact with the high contrast (high gamma) recording film used to produce screen color separations 106*c*, 106*m* and 106*y*, respectively.

Figure 2:
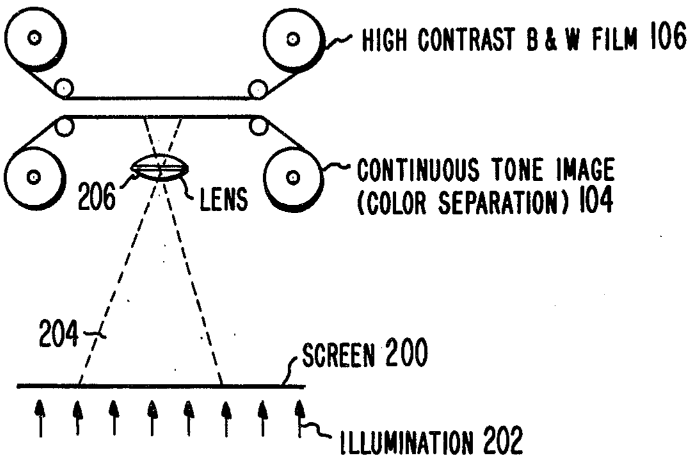
FIG. 2 is a schematic diagram of apparatus for producing black-and-white screened color separation of FIG. 1.

These problems have been overcome by using a typical commercial contact screens of 150 lines/inch in a non-conventional manner, as is shown in FIG. 2. Specifically, any one of the continuous tone image color separation strips 104 (104*c*, 104*m* and 104*y*) is placed in direct contact with high-contrast black-and-white (b/w) film 106. A remotely situated typical 150 line-/inch commercial contact screen 200 is illuminated by a diffuse illuminating light source 202. This diffused source of light 202 may be obtained from a row of fluorescent tubes behind a diffuser. The screened light pattern 204 emerging from screen 200 is imaged by lens 206 with slightly more than a 4× reduction onto a plane which is coincident with that of the continuous-tone image on strip 104 then being printed. Lens 206 is a high quality lens (e.g., Nikkon 150 mm F/5.6 lens). The high contrast b/w film 106 must have a sufficiently high resolving power to define screening dots of an area down to about 5 percent of the unit screening area (i.e., about 9 mm linear dimension with a 40 μm period unit screen). Kodalith Ortho film type 3, developed in Kodalith Super RT developer (products of Kodak) have been shown to satisfy this requirement. (For ultimate resolution coupled with high contrast, a recording medium, such as a photoresist coated chrome film on plastic, could be used. In this case, the photoresist is exposed and developed and the chrome etched to give the high contrast pattern). Halftone screen refinements, such as a magneta screen and/or elliptical dot screens, can also be applied here. The technique shown in FIG. 2, which is essentially a contact printing of a continuous-tone image, using a half-tone screen illumination, has been shown to give good gray scale. The contact printing feature ensures the image registration with respect to the film perforations is maintained. Existing contact printing equipment can be easily modified to this operation by changing the illumination system to incorporate the screen and imaging lens.

It should be noted that areas of text and line drawing in pictures 100 are also subjected to screening in the technique described here. This is necessary to avoid the considerable extra cost and time involved in separating the text before screening the continuous tone picture areas and reinserting it after screening, as is conventional in the printing trade. It has been shown that excellent text reconstruction is obtained provided the letters have a height of at least 2-3 screening periods. A typical 21×30 cm printed page has a minimum letter height of about 1 mm. At 5× reduction the letters are then about 200 μm high, so that a 40 μm screening period easily satisfies this requirement.

Other techniques for screening continuous tone images can also be used here. For example, the generation of a contact screen with 600 lines/inch (approximately 40 μm) or even a 2500 line/inch (approximately 10 μm) is basically possible with refinements in the screen recording techniques and materials. However, the technique described above uses only existing screens and recording materials.

It is possible to combine the derivation of the continuous tone image strips 104*c*, 104*m* and 104*y* with the generation of the screens separation 106*c*, 106*m* and 106*y*, using a gray contact image screen imaged onto the color film in contact with a panchromatic lithographic film using red, green and blue illumination. Such techniques are known in the art and can be applied here, although the arrangement shown in FIG. 1 is to be preferred.

Figure 3:
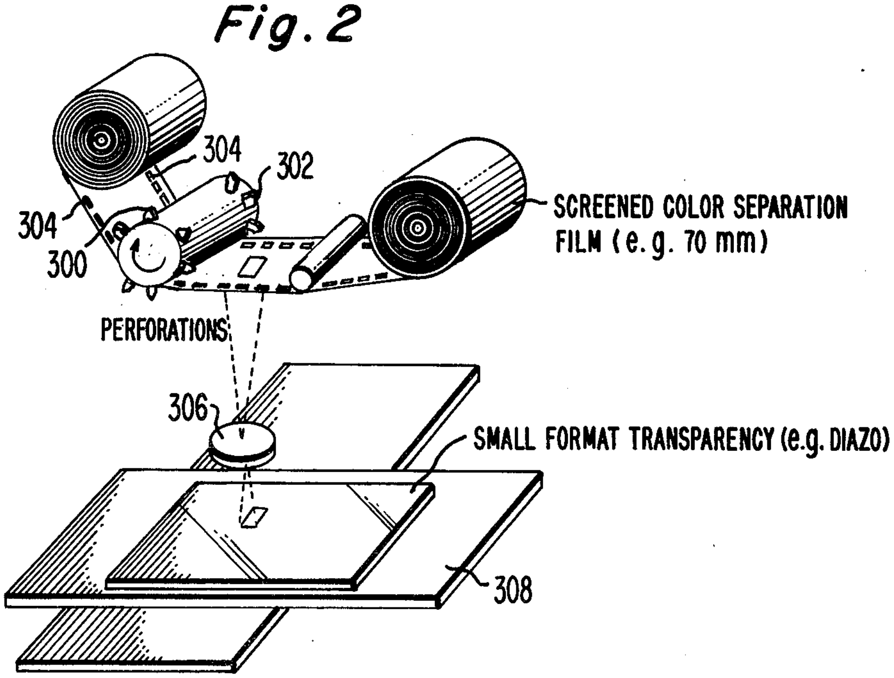
FIG. 3 is a schematic diagram of apparatus for producing the microfiche transparency of FIG. 1.

Returning to FIG. 1, the next step is a second reduction of about 4×, together with the transformation from 70 mm film strip format to microfiche transparency format. Specifically, the high contrast, screened color separations 106*c*, 106*m* and 106*y* are each imaged at 4× reduction onto a high resolution recording medium such as Diazo film (e.g. G-41 P4C Diazo Contact Duplicating film sold by Scott Graphics Inc., or other commercial Diazo films for microfilm application). The images are positioned on the Diazo film in the final microfiche array. Accurate positioning is required to hold the image to image registration. Apparatus for achieving this is shown in FIG. 3. A precision film transport with pins 300 and 302 locating the film perforations 304 successively positions each film frame above imaging lens 306. The Diazo film sheet (typically about 10×15 cm in size) is positioned using a precision XY movement 308, such that the 4× reduced image falls at exactly the correct location and is stepped to a new position for each image exposure. This way all images on each of film strips 106*c*, 106*m*, and 106*y*, respectively, are transferred to a corresponding array on microfiche transparency 108*c*, 108*m* and 108*y*, respectively, with accurate image-to-image positioning. A required positioning accuracy of about 20 μm of the 70 mm film strips 106*c*, 106*m* and 106*y* and a 5 μm required positioning accuracy for the Diazo film for an overall reduction of as much as 24× microimage is obtainable.

Each of Diazo microfiche transparencies 108*c*, 108*m* and 108*y* is contact printed onto corresponding embossing master blanks using blue or ultraviolet illumination. Development and electroplating of the blank (in the manner described in the aforesaid patent application Ser. No. 781,304) produces the required embossing masters 110*c*, 110*m* and 110*y*.

Alternatively, the use of microfiche transparency 108*c*, 108*m* and 108*y* can be eliminated by having the screened color separation strips 106*c*, 106*m* and 106*y* reduced directly onto the master blank 110*c*, 110*m* and 110*y*, using mercury lamp (ultraviolet) illumination.

The use of positive or negative color film 102 will result in opposite image polarity on the final embossing masters 110. The polarity (positive or negative) will depend on the media and processing used in steps 104, 106 and 108 and on the type of master blank. If this polarity is the wrong one, it can be inverted by an additional contact printing step, preferably by contact printing black-and-white screened separations 106 onto high contrast black-and-white, reversal processed film.

In addition to image-to-image registration, all images must be accurately positioned on each of the three microfiche masters 110*c*, 110*m* and 110*y* with respect to some alignment feature, so that the cyan, magneta and yellow plastic replicas can be readily aligned. This feature may be, for example, an optical marking, punched holes, or a set of grooves or ridges on the master blank. A tongue-and-grooved structure (about 200 $\mu$m wide and 80 $\mu$m deep) present in the master blank and thus, on the master, and embossed into the replicas, has been found to give excellent alignment (registration to a few micrometers).

Excellent picture and text reproduction has been obtained by superposition of the cyan, magneta and yellow replicas. It has been found that a fourth, black replica does not significantly improve picture quality and is therefore, not included in the preferred arrangement shown in FIG. 1. (In principle, a fourth black replica can be added to the 3 color replicas, in a manner analagous to that employed in conventional "four color" printing).

With minor modifications, the technique shown in FIG. 1 may be employed for deriving a diffractive subtractive filter embossing master from a group of separate continuous-tone, black-and-white pictures, rather than a group of color pictures 100. In this case, no color separation is required and only a single embossing master blank having a sinusoidal diffractive structure is employed (rather than three separate blanks having rectangular diffractive structures). Further, a continuous-tone, low gamma, black-and-white film (similar to that employed for the color separations 104*c*, 104*m* and 104*y* in FIG. 1) is substituted for color film 102. Since black-and-white film has a much higher resolution capability than color film, the approach described above for removing any screening already present in the original pictures cannot be used in the case of black-and-white. Instead, to avoid the Moire problem, in the case of black-and-white, screen 200 is rotated so that the screen lines of the screen 200 are oblique with respect to any screen lines already present in the continuous-tone image. This prevents observable Moire effects in the resultant screened image in the high contrast black-and-white film, corresponding to film 106.

If desired, a microfilm strip may be substituted for the microfiche transparencies shown in FIG. 1. Alternatively, a large film sheet, (about 30×50 cm) employing the microfiche format may be substituted for the 70 mm color film 102, since commercial contact printing and processing equipment can handle this sheet size.

In principle, the contact printing steps could be replaced by 1:1 (or some other factor) imaging steps, although in practice contact printing is simpler and more reliable.

Also, as indicated above, a 35 mm intermediate format, rather than a 70 mm format, may be employed although this has the disadvantage of increasing the registration, screening and film resolution requirements. Further, in this case, the first reduction would be about 10 and the second reduction would be about 2.

What is claimed is:

1. Apparatus useful in the fabrication of a diffractive-subtractive filter embossing master of micropicture information in a given format; said apparatus comprising:

a printing screen having a predetermined first period, means situated on one side of said screen for illuminating said screen with diffuse light, a reducing imaging lens situated on the other side of said screen for deriving at an image plane of said lens a screened pattern of light having a second period which is reduced by a given factor with respect to said first period, and means situated substantially in said image plane for contact printing a continuous-tone picture medium on a high-contrast photosensitive recordng medium with said screened pattern of light.

2. The apparatus defined in claim 1, wherein said first period is in the order of 170 micrometers.

3. The apparatus defined in claim 2, wherein said second period is in the order of 40 micrometers.

4. The apparatus defined in claim 3, wherein said continuous-tone picture medium and said high-contrast photosensitive recording medium both comprise 70 millimeter film.

5. The apparatus defined in claim 3, wherein said continuous-tone picture medium comprises 70 millimeter film and said high-contrast photosensitive recording medium comprises a photoresist-covered layer of chrome.

6. A method for use in fabricating a finely-screened diffractive subtractive filter embossing master of micropicture information in a given format from a plurality of separate relatively large-size pictures which already may be screened; said method comprising the steps of:

first, recording on the same first medium all of said plurality of initially large-size pictures in a certain format in continuous tone at a first reduction to a size intermediate said large size and the final size of a micropicture, said first reduction being sufficient to reduce any screening initially present in a large size picture to unresolvability at said intermediate size, transferring in said certain format to a high-contrast medium at said intermediate size a screened image of each continuous-tone picture on said first medium, each of said screened images being transferred with a given screening period, and second, recording in said given format on a second medium at a second reduction to said final micropicture size each of said screened image.

7. The method defined in claim 6, wherein said first reduction is in the order of 5.

8. The method defined in claim 7, wherein said second reduction is in the order of 4.

9. The method defined in claim 8, wherein said screened images are transferred with a given screening period of substantially 40 micrometers, whereby each final micropicture exhibits a screening period of substantially 10 micrometers.

10. The method defined in claim 6, wherein said first reduction is in the order of 10.

11. The method defined in claim 10, wherein said second reduction is in the order of 2.

12. The method defined in claim 6, wherein said large-size pictures are color pictures and wherein said step of first recording comprises the steps of:

first recording in said certain format at said first reduction on color film, and then contact printing said color film on panchromatic black-and-white film with light of a subtractive primary color thereby to make a color-separation recording in said certain format at said intermediate size of each picture in said continuous tone.

13. The method defined in claim 6, wherein said step of transferring comprises the step of:

contact printing said continuous tone first medium directly on said high-contrast second medium with a screened-pattern of projected illuminating light having said given screening period.

* * * * *